United States Patent [19]
Stetson
[11] Patent Number: 4,676,402
[45] Date of Patent: Jun. 30, 1987

[54] QUICK RELEASE AERATOR

[75] Inventor: Harold M. Stetson, Neponset, Ill.
[73] Assignee: Martin Engineering Company, Neponset, Ill.

[21] Appl. No.: 848,270
[22] Filed: Apr. 4, 1986
[51] Int. Cl.[4] B67B 7/24; B65G 69/06
[52] U.S. Cl. 222/3; 222/195; 406/137
[58] Field of Search 222/195, 3, 496, 495, 222/498, 518, 630, 637, 497, 511, 559; 406/137, 136; 366/107, 106, 101; 414/288; 137/199, 197, 202, 102

[56] References Cited

U.S. PATENT DOCUMENTS 3,788,527 1/1974 Matson 222/195
3,942,684 3/1976 Stetson 222/195 X
4,051,982 10/1977 Stetson 222/3 X
4,281,779 8/1981 Shepard 222/518 X
4,469,247 9/1984 Tompkins 222/195 X

*Primary Examiner*—Joseph J. Rolla
*Assistant Examiner*—David H. Bollinger
*Attorney, Agent, or Firm*—Mann, McWilliams, Zummer & Sweeney

[57] ABSTRACT

A quick release aerator is provided for discharging intermittent bursts of pressurized air into a storage container to implement material flow. The unit includes a piston and valve assembly disposed internal to a pressure tank. The assembly features one or more vent ports defined through the sidewalls of a cylinder to allow the passage of pressurized air from the tank to an outlet orifice. The total area of the vent ports equals or exceeds the area of the exhaust port, thereby maximizing the effect of the burst of pressurized air.

9 Claims, 3 Drawing Figures

QUICK RELEASE AERATOR

BACKGROUND OF THE INVENTION

The present invention deals with an improved construction of an internal valve quick release air cannon. Devices of this type are utilized to accumulate pressurized air and, upon receipt of a controlled signal, to rapidly discharge a burst of pressurized air into the interior of a storage hopper. The intermittent bursts of pressurized air promote the flowability of material in the hopper preventing hang up and bridging of material internal to the hopper. Typical prior art arrangements are shown in U.S. Pat. Nos. 3,942,684 and 4,051,982 issued to applicant. These patents illustrate "external valve" arrangements in which the piston and valve are located outside of the tank. One example of an "internal valve" arrangement is shown in U.S. Pat. No. 3,788,527 of applicant. This aerator, like the present arrangement, has the piston and valve assembly disposed inside the pressure tank.

SUMMARY OF THE INVENTION

To maximize the effectiveness of the bursts of pressurized air delivered from the tank to the hopper, it is necessary to optimize the flow of air when the piston unseats from the seal. In prior art arrangements, the area of the flow passage from the pressure tank to the outlet of the unit was always the limiting factor since this area was always less than the area of the exhaust port. Depending upon the relative difference in areas, this restriction to flow presented either substantial or moderate impedance to maximizing the force generated by the air bursts directed into the hopper. Flow was restricted by the nozzle effect of the flow passage and by sonic velocity. The present invention allows optimization of the force generated by such bursts to be achieved by sizing the area of the vent ports which define the passage from the tank to the outlet port to be equal to or greater than the area of the outlet port itself.

DESCRIPTION OF THE PREFERRED EMBODIMENT

Figure 1:
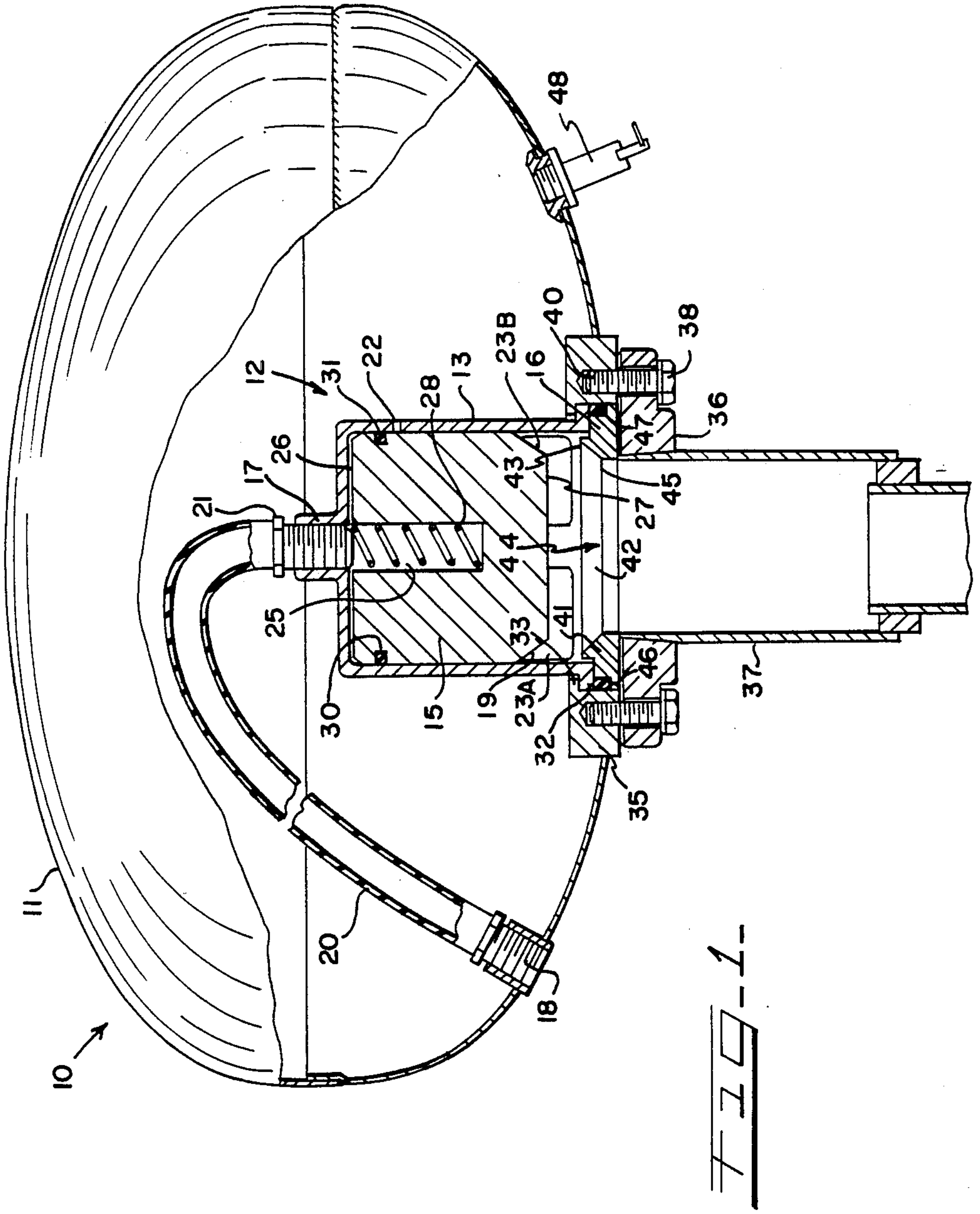
FIG. 1 is a side view partially broken away showing the aerator of the present invention with the piston in its raised or unsealed condition.

FIG. 1 illustrates a quick release air discharge unit 10 which is adapted to be connected to a storage vessel to discharge intermittent bursts of pressurized air thereby promoting the flowability of material in the hopper. The aerator or air discharge unit includes a pressure tank 11, shown in FIG. 1, as being ellipsoidal in configuration. The ellipsoidal shape of the pressure container 11 provides a number of benefits including providing for a straighter, less interrupted flow of pressurized air than in typical prior art embodiments. It also results in a less costly installation than those used in the past.

Figure 2:
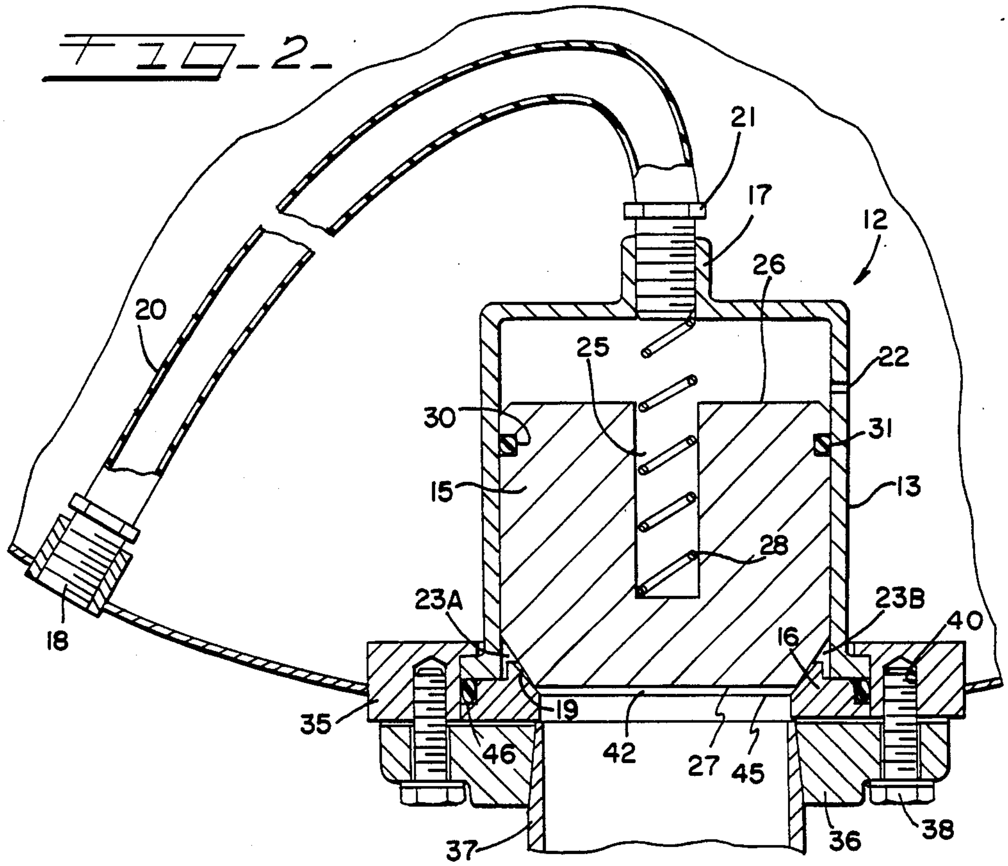
FIG. 2 is a side view partially broken away of the piston and valve arrangement showing the piston in its downward or sealed position.

Disposed within the pressure container 11 is a piston and valve assembly 12 consisting of a cylinder 13, a piston 15, and a seal 16. The piston 15 is slidably disposed within the cylinder 13 and normally assumes the closed position as illustrated in FIG. 2. For purposes of reducing the mass of the piston, it is desirable to construct it of lightweight material, for example, plastic or aluminum or rubber. The cylinder defines a fluid inlet 17 disposed at one end thereof.

A fluid inlet port 18, shown in the form of a fluid coupling or connector, is disposed in a wall of the tank 11. The connector 18 is adapted to be connected to any suitable source of pressurized fluid, such as, for example, a compressor, not shown. A conduit 20 connects fluid inlet port 18 and the inlet 17 of cylinder 13. If the conduit 20 is formed of rubber or some other material subject to collapse under pressure, it has been determined advisable to insert a spring, not shown, in the interior thereof to prevent collapse from exposure to the pressure generated in the tank 11. A connector 21 couples the conduit 20 to the inlet 17 of cylinder 13.

Figure 3:
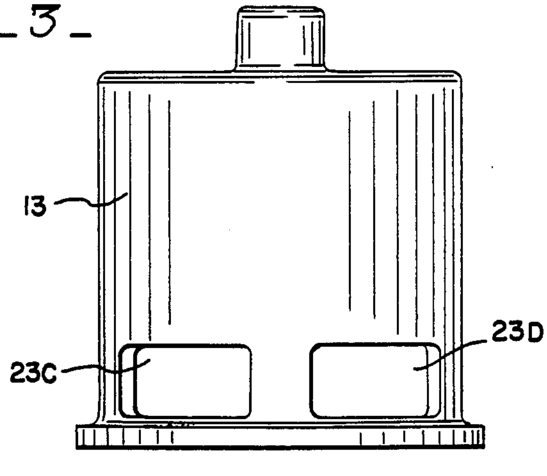
FIG. 3 is a side view illustrating only the cylinder of the present invention.

An orifice 22 is defined in the sidewall of the cylinder 13 adjacent the end on which the inlet 17 is disposed. This orifice is relatively small in size and allows a restricted flow of air from the pressure source to the tank when the piston is in the position illustrated in FIG. 2. Also formed in the wall of cylinder 13 are one or more vent ports 23A, 23B, 23C, and 23D. Ports 23A and 3B are shown in FIG. 1, and ports 23C and 23D are illustrated in FIG. 3. The exact number, dimensions, and configuration of the vent ports 23 can be determined according to relevant design characteristics of the aerator so long as the relative relationship between the vent port area and that of the outlet port is consistent with the principles of the present invention, namely, that the total area of the vent ports be equal to or greater than the area of the exhaust port.

The piston 15 defines, toward its lower face, an inwardly sloping chamfer 19, the purpose of which will be described later. The piston 15 defines a bore 25 in its central portion extending from the upper face 26 of the piston to a point below the center of the piston, but short of the lower face 27 of the piston. The bore 25 provides a recess in which a spring 28 is located. The upper end of spring 28 abuts against the inside upper wall of the cylinder 13 so as to bias the piston 15 into its downward or sealing position as shown in FIG. 2. The piston 15 further defines a groove 30 around its upper perimeter within which is disposed an O-ring 31 for the purpose of restricting the flow of air between the sidewall of piston 15 and cylinder 13.

The cylinder housing 13 includes an outwardly disposed leg 32 which is adapted to be positioned within a corresponding outwardly extending leg 33 in flange 35. The flange 35 is secured within an opening defined in the wall of the tank 11. A mating flange 36 carries exhaust pipe 37 which communicates pressurized air from the tank to the hopper. The flange 36 is adapted to be connected to the flange 35 by means of bolts 38 secured into threaded recesses 40 formed in the flange 35. Such an arrangement assures easy removal of the piston and valve assembly and the seal from the tank when servicing or replacement is indicated.

As shown in FIGS. 1 and 2, the seal member 16 is secured between flange 35 and housing 13 and lies within a recess formed in flange 35. The seal 16 consists of an annular base member 41 and a chamfered face section 42 which includes an upper end 43 and a lower end 45. An annular exhaust port 44 is defined by the lower end 45 of the chamfered face. It is this exhaust port which must have an area equal to or less than the total area of the vent ports 23. In order to insure a quick release action when the piston is depressurized, it is desirable to maximize the differential area of the piston which is exposed to the pressurized fluid in the tank. Accordingly, the chamfer 19 is designed with a slope which is greater than the slope of the chamfer 42. In a preferred embodiment, which has functioned in a satisfactory manner, the chamfer 19 is cut at an angle of 55°, while the chamfer 42 is cut at an angle of 48°. The difference of 7° results in a greater differential area of the piston 15 being exposed to the pressure in the tank 11 as shown in FIG. 2. The length of the chamfered face 19 is greater than the length of the chamfer face section 42 which assists the snap action release. The actual point at which the piston contacts the seal is located as far down the face section 42 as possible. The seal member 16 defines an annular groove 46 in its outer perimeter in which an O-ring 47 is positioned.

A pressure relief valve 48 of standard design is shown disposed in the wall of the pressure tank 11 to prevent the accumulation of air beyond the design parameters of the tank.

The operation of the present invention is as follows. Prior to pressurization of the unit, the piston 15 assumes the position illustrated in FIG. 2. The force of gravity, in combination with the force exerted by spring 28, resiliently biases the piston 15 downwardly so that a portion of the chamfered face 19 of the piston lies against a portion of the chamfered face section 42 of the seal. This position of the elements blocks any fluid flow between the pressure source and the exhaust pipe 37. Once the unit is pressurized, the pressure source delivers pressurized fluid through coupling 18, conduit 20, and connection 21 through the inlet 17 of the cylinder. The pressurized fluid passes through the restricted orifice 22 into the tank 11 and is allowed to accumulate in the tank with the pressure increasing. In most installations, the pressurized fluid is air, but for certain applications, other fluids may be preferred. The pressure within the container acts on the top face of the piston 15 supplementing the force of the spring 28 and urging the piston downwardly against the seal 16, thus preventing the flow of air from the tank 11 through the exhaust 37.

This condition continues until such time as the pressure in the container reaches the pressure determined to be appropriate for discharge. Any of a number of mechanisms are known in the art to trigger discharge including timers or a variety of pressure responsive flow control devices. Once it has been determined to release a burst of air from the tank, the inlet 18 is depressurized and the inlet 17 of the cylinder 13 is placed in communication with atmosphere. This releases the force of the pressurized air previously acting on top of the piston to urge it downwardly. Simultaneously, the pressurized air in the tank 11 acting on the exposed portion of chamfer face 19 exerts a force on the piston in an upward direction of a magnitude far in excess of the downward force exerted by the spring 28. The piston 15 immediately snaps upwardly to the position shown in FIG. 1 thereby unsealing the outlet port 44 defined by the lower end 45 of the chamfer face section 42. Since the total area of the vent ports 23 is equal to or greater than the area of the exhaust port, pressurized air rushes, without reduction in velocity or volume, through the vent ports 23, the exhaust port 44, and the exhaust tube 37 into the silo or hopper to which the air discharge unit is connected. The relative relationship between the total area of the vent ports 23 being equal to or greater than the area of the outlet port 44 results in an optimum force generated by the burst of air discharged into the container, the optimum force being the shortest pressure pulse.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A quick release air discharge unit adapted to be connected to a storage vessel for facilitating the flow of materials including a pressure tank, a piston and valve assembly disposed within said pressure tank consisting of a cylinder defining a fluid inlet at one end and an outlet at the other end, one or more vent ports defined in the wall of said cylinder adjacent said cylinder outlet adapted to allow the passage of air from said tank to said outlet, said vent ports having a defined area, a piston slidably disposed within said cylinder adapted to assume either a first or second position, an orifice defined in the wall of said cylinder adjacent said inlet to allow restricted fluid flow from said cylinder to said tank when said piston is in said first position, a seal member adjacent the outlet end of said cylinder, an exhaust port defiing a cross-sectional area less than or equal to said defined area of said vent ports for communicating pressurized air from said vent ports to said storage vessel, a fluid inlet port defined in a wall of said tank adapted to be connected to a source of fluid pressure, a fluid conduit connected between said fluid inlet port and said cylinder inlet, said unit operative such that said piston is normally biased to assume said first position, engaging said seal, allowing fluid to flow from said pressure source, through said cylinder inlet and said orifice to the interior of said tank, said piston, in said first position, being effective to block communication from said tank to said exhaust port and, when said inlet port is depressurized, said piston is acted upon by said pressure in said tank and forced to assume said second position, closing said orifice and allowing a burst of pressurized air from said air tank through said vent port, through said exhaust port into said storage vessel, whereby the relationship of said exhaust port area to said vent port area is effective to maximize the effect of said burst of pressurized air.

2. A quick release air discharge unit as in claim 1 including resilient biasing means disposed between said piston and said cylinder adapted to urge said piston into said first position.

3. A quick release air discharge unit as in claim 1 in which said piston and valve assembly is removably disposed within said tank and adapted for easy removal therefrom.

4. A quick release air discharge unit as in claim 1 in which a plurality of vent ports are defined in the wall of said cylinder positioned at the lower end thereof and located around the periphery thereof.

5. A quick release air discharge unit as in claim 1 including a flange member adapted to be connected to said piston and valve assembly and wherein said seal is secured between said flange and said cylinder for easy removal and replacement.

6. A quick release air discharge unit as in claim 1 in which said piston defines at its lower end an inwardly sloping chamfer and in which a chamfer is also defined on an internal face of said seal whereby when said piston engages said seal, a surface of said piston is exposed to the pressurized air in said tank through said vent ports.

7. A quick release air discharge unit as in claim 6 in which the slope of said chamfer on said piston is greater than the slope of said chamfer on said seal.

8. A quick release air discharge unit as in claim 1 in which said pressure tank is ellipsoidal in configuration.

9. A quick release air discharge unit as in claim 1 in which said cylinder is formed of plastic to prevent corrosion internal to the cylinder.

* * * * *